(12) United States Patent
Kawai et al.

(10) Patent No.: US 6,731,862 B1
(45) Date of Patent: May 4, 2004

(54) VIDEO IMAGE EDIT DEVICE

(75) Inventors: Sunao Kawai, Toyoake (JP); Kenji Miyata, Nagoya (JP); Ryuji Yamada, Ogaki (JP); Hideaki Teshima, Tokoname (JP); Kazuma Aoki, Kasugai (JP); Norihisa Fujii, Tokoname (JP); Yoshihiko Horibe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 740 days.

(21) Appl. No.: 09/692,142

(22) Filed: Oct. 20, 2000

(30) Foreign Application Priority Data

Oct. 21, 1999 (JP) .......................................... P11-298999

(51) Int. Cl.$^7$ ................................................ H04N 5/91
(52) U.S. Cl. ........................................... 386/69; 386/52
(58) Field of Search .............................. 386/52, 55, 95, 386/125, 126, 69

(56) References Cited

U.S. PATENT DOCUMENTS

| | | | |
|---|---|---|---|
| 6,181,870 B1 * | 1/2001 | Okada et al. ................. | 386/95 |
| 2001/0012437 A1 * | 8/2001 | Yamamoto ................... | 386/55 |
| 2002/0191957 A1 * | 12/2002 | Ito .............................. | 386/52 |
| 2003/0091329 A1 * | 5/2003 | Nakata et al. ................ | 386/52 |

FOREIGN PATENT DOCUMENTS

JP    A-10-32783    2/1998

* cited by examiner

*Primary Examiner*—Chris Kelley
*Assistant Examiner*—Alicia M. Duggins
(74) *Attorney, Agent, or Firm*—Oliff & Berridge, PLC

(57) ABSTRACT

A video image edit device for editing video image contents recorded on a video tape. The video tape is rewound to its leading end and a start point time code and a maximum video image content period are stored in a RAM. Then, a video reproduction is started and a time code and time information for a video image content are retrieved. A difference between the present time and a precedent time is compared with a predetermined period to detect discontinuity of the video image content. If discontinuity cannot be detected, judgment is made as to whether or not a difference between the present time code and a start point time code exceeds the maximum video image content period to determine a subdivision point. If discontinuity is detected, or if the difference exceeds the maximum video image content period, a present end point time code and next start point time code are stored for again detecting the discontinuity or judging the next subdivision point.

26 Claims, 12 Drawing Sheets

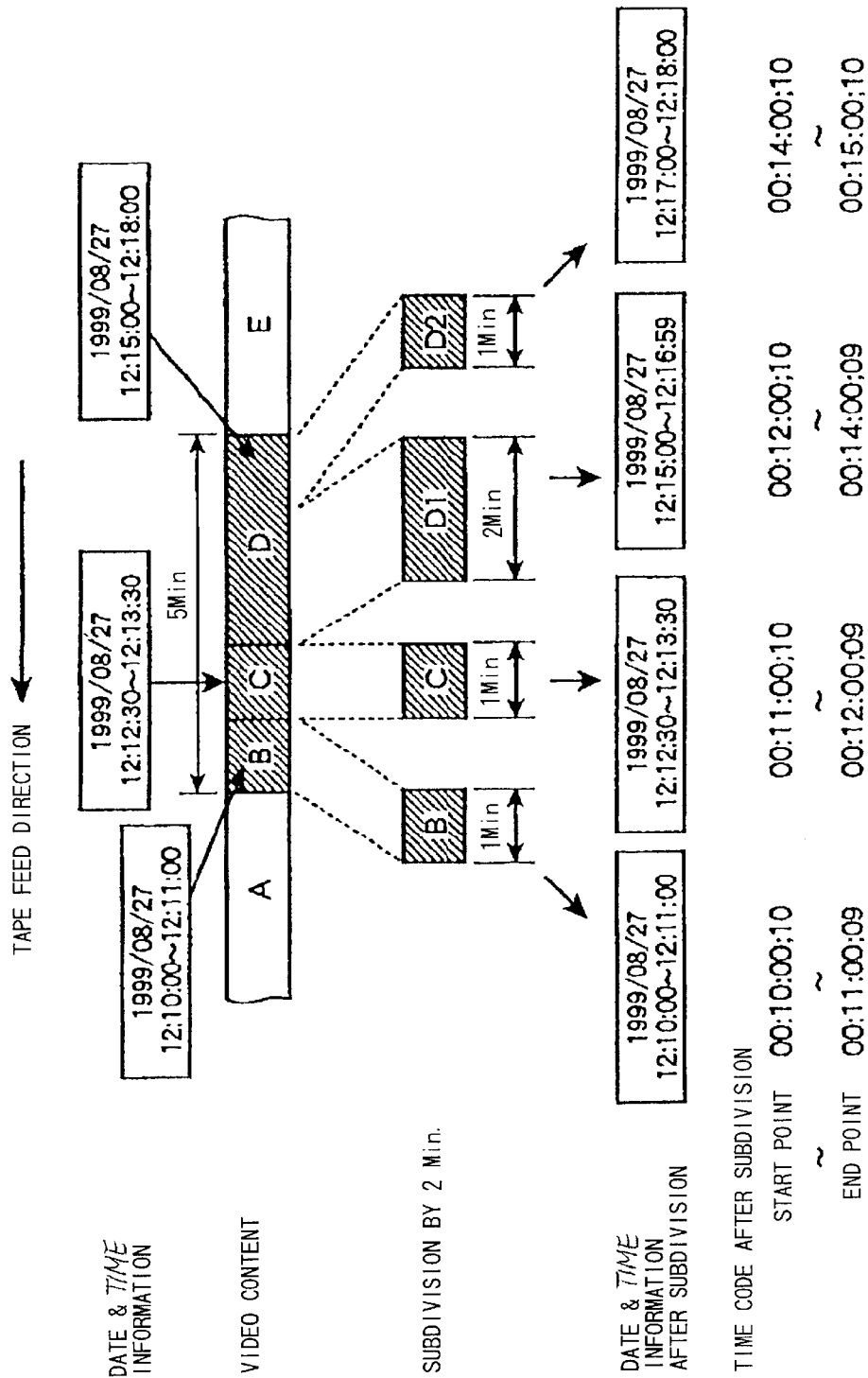

VIDEO IMAGE EDIT DEVICE

BACKGROUND OF THE INVENTION

The present invention relates to a video image edit device, and more particularly, to such device suitable for editing video images picked up by a video camera.

For editing video images picked up by a video camera, pickup date and time, etc., those recorded in a video tape together with the video image are conventionally used as disclosed in Japanese Patent Application Kokai No. Hei 10-32783. FIG. 10 shows a recording region of the video tape 11. The recording region includes a video image recording region 12, an audio recording region 13 and a subordinate code region 14 for recording various data.

Typical data to be recorded in the subordinate code region 14 are image pickup date and time information, tape position information to be utilized for video editing, and a time code information indicative of a total reproducing period from a reference position. The date and time information and the time code information are recorded in the subordinate code region of the video tape 11 concurrently with the recordation of video image and audio information in the video tape 11.

Regarding date and time information, continuous date and time information are recorded in the video tape during continuous pickup by using a calendar/clock function provided in a video camera. However, once the image pick up is stopped, and then is re-started, date and time information recorded in the vide tape becomes discontinuous from the date and time of the precedent clip.

Regarding the time code information, a video device retrieves a time code information with respect to the precedent recording at the present video tape position, and records a subsequent time code in the video tape during subsequent image pick up operation. Accordingly, the time codes are recorded in a manner of hour:minute:second; frame as a continuous absolute time. Incidentally, the video device referred herein is one of the video camera and a video deck. More specifically, in NTSC type television image signals, 30 image frames are displayed within one second. The image data are recorded in the video tape in a mode of 30 frames per one second. The time code including the frame information is recorded as a tape position information.

In order to cut the video image in the video tape, a discontinuous point of the date and time information is detected from the continuously picked up video image, and determines the discontinuous point as the cut point of the video image.

FIG. 11 is a view for description of a cut point of the video image content. While the video tape carrying picked up video images runs in a tape feed or forward direction indicated by an arrow, date and time information is successively retrieved for monitoring the discontinuity of the date and time information. During the detection, a discontinuous point AB can be detected as shown in FIG. 11 which is the ending point of the video image content A, that is, date and time information of "Aug. 27, 1999, 10:32:20", and the starting point of the video image content B, that is, date and time information of "Aug. 27, 1999, 12:10:10". If the difference between the end point and the starting point is greater than a predetermined time period (hereinafter simply referred to as a "discontinuous margin time period" which could be 1 second as a minimum resolution), this point "AB" is determined as the discontinuous position, and a time code of "00:10:00;10" is obtained as a cut point time code.

Then, another discontinuous point "BC" is detected as shown in FIG. 11 which is the ending point of the video image content B, that is, date and time information of "Aug. 27, 1999, 12:15:10", and the starting point of the video image content C, that is, date and time information of "Aug. 28, 1999, 10:03:10". The point "BC" is determined as another discontinuous position, and a time code of "00:15:00;10" is obtained as another cut point time code. The start point time code and end point time code of the video image content B will become cut point information for the video image content B.

In the above described process, if a video pick up is continuously performed for a long period or if the discontinuous margin time period is set greater than a period during which image pick up operation is temporarily suspended, a resultant video image content cut-out by the cut point information will have a long reproduction period.

Video image contents stored in a multi media optical disk typically represented by DVD (digital versatile disk) are read out by a manipulation of a button on a menu displayed on a display device, so that a selected content is reproduced or played. If each content has excessively long play, a searching function, which is the typical function in DVD will be degraded, and the resultant multimedia optical disk may provide a lower handling ability.

In order to avoid this problem, various editing operation have been proposed. For example, a relatively long period video image content is searched, and the searched content is subdivided into a plurality of contents. More specifically, according to the conventional editing operation, reproducing period of each video image content is computed based on start point time code and end point time code those serving as cut point information of all cut out video image contents. Then, a video image content which is deemed to be long period content is searched by checking each reproducing period of each video image content. Then, start point time code and end point time code are newly set in order to subdivide the searched long period content into a plurality of video image contents. If the end of the video image content is to be in conformance with the image pick up end position, the searched long period video content is reproduced to acknowledge the end position, and a time code at the end position is recorded, and then the above described subdivision is performed. Such conventional editing operation requires much labor and is time consuming.

SUMMARY OF THE INVENTION

It is therefore an object of the present invention to provide a video image edit device capable of efficiently editing a long period video image content into short period video image contents.

This and other objects of the present invention will be attained by an improved video image edit device for editing at least one video image content among a plurality of video image contents those recorded on a recording medium. The recording medium also records thereon time information indicative of data of time at which image pick up operation is performed for recording the video image content into the recording medium, and data of total reproducing period indicative of a recording position of the recording medium. The device includes a storage device, a judging device, a subdivision determination device, and a subdivision device. The storage device stores data of present total reproducing period and data of present time information with respect to the present video image content, data of precedent time information, data of total reproducing period information with respect to a start point of a video image content to be edited, and a maximum video image content period. The judging device judges a discontinuity when a difference between the present time and the precedent time exceeds a predetermined level. The subdivision determination device determines a necessity of subdivision if the judging device judges a continuity and if a difference between a present total reproducing period and a total reproducing period at the start point exceeds the maximum video image content period. The subdivision device subdivides the video image content to be edited if the subdivision judgment device judges the necessity.

In another aspect of the invention, there is provided an improved video image edit device including a storage device, a judging device, a subdivision determination device, and a subdivision device. The recording medium records thereon the above described information. The storage device stores data of present time information with respect to a present video image content, data of precedent time information, data of time information with respect to a start point of a video image content to be edited, and a maximum content period. The judging device judges a discontinuity when a difference between the present time and the precedent time exceeds a predetermined level. The subdivision determination device determines a necessity of subdivision if the judging device judges a continuity and if a difference between a present time and a time at the start point exceeds the maximum content period. The subdivision device subdivides the video image content to be edited if the subdivision judgment device judges the necessity.

In still another aspect of the invention, there is provided a video image edit program storage medium for editing at least one video image content among a plurality of video image contents those recorded on a recording medium, the recording medium also recording thereon time information indicative of data of time at which image pick up operation is performed for recording the video image content into the recording medium, and data of total reproducing period indicative of a recording position of the recording medium. The storage medium contains a program of storing data of present total reproducing period and data of present time information with respect to the present video image content, data of precedent time information, data of total reproducing period information with respect to a start point of a video image content to be edited, and a maximum video image content period, a program of judging a discontinuity when a difference between the present time and the precedent time exceeds a predetermined level, a program of determining a necessity of subdivision if the judging program judges a continuity and if a difference between a present total reproducing period and a total reproducing period at the start point exceeds the maximum video image content period, and a program of subdividing the video image content to be edited if the judging program judges the necessity.

In still another aspect of the invention, there is provided a video image edit program storage medium. The storage medium contains a program of storing data of present time information with respect to a present video image content, data of precedent time information, data of time information with respect to a start point of a video image content to be edited, and a maximum content period, a program of judging a discontinuity when a difference between the present time and the precedent time exceeds a predetermined level, a program of determining a necessity of subdivision if the judging program judges a continuity and if a difference between a present time and a time at the start point exceeds the maximum content period, and a program of subdividing the video image content to be edited if the subdivision judgment program judges the necessity.

According to the present invention, a long play video image content can be efficiently and easily edited into a plurality of video image contents of desired period, and the present invention is available for a system which does not provides a total reproducing period information.

The present invention is particularly available for an information generating system for recording moving picture information and audio information contained in a video tape onto a multimedia optical disk such as a DVD as described in a co-pending U.S. patent application Ser. No.09/536,690 filed Mar. 28, 2000, the disclosure of which is hereby incorporated by reference. That is, the video image editing process (process of detection of a cut point of a moving picture image) according to the present invention can be incorporated into a scenario information input process in the information generating system of the co-pending U.S. Patent application. According to the detection process, a start position and end position of one unit moving picture(video content) recorded in the video tape are extracted with a time code, and the extracted information is displayed on a display for notification to an operator. Based on the displayed time code information, the operator inputs desired start position and end position of the moving picture as an information to be listed in a video image time position information list into an input format displayed as a result of execution of the scenario information input program.

With the above process, scenario information is generated, and the generated scenario information is converted to an information to be recorded in the multimedia optical disk such as DVD in accordance with the method described in the co-pending U.S. Patent Application.

The above described storage device, judging device, subdivision determination device, and subdivision device are provided by a CPU of a computer in combination with an appropriate programs with which the CPU operates. Instead, a plurality of separate chips can be prepared for the respective devices and can be electrically connected together.

BRIEF DESCRIPTION OF THE DRAWINGS

In the drawings:

FIG. 9(a) is a view showing a mode of subdivision of the long period video image content with the date and time information according to the third embodiment of the present invention;

DETAILED DESCRIPTION OF THE PREFERRED EMBODIMENTS

Video image editing process (moving picture cut detection process) according to several embodiments of the present invention will be described with reference to FIGS. 1 through 9.

Figure 1:
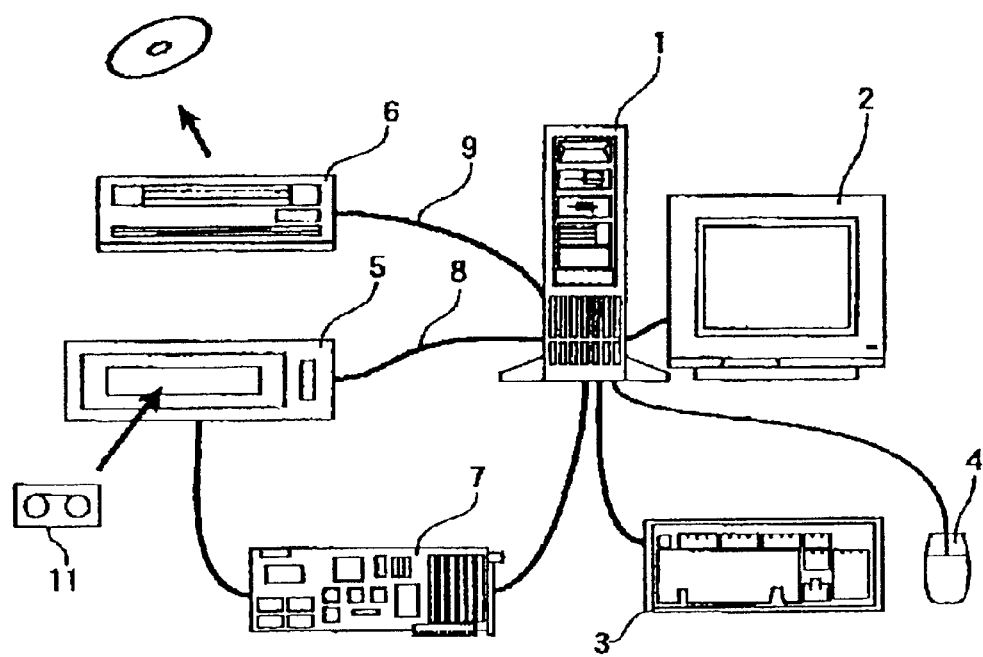
FIG. 1 is a schematic view showing an entire video image editing arrangement to which the present invention is applied.

The present embodiments are applied to a video image editing apparatus shown in FIG. 1. The apparatus includes an information generating main device 1 such as a personal computer, a display 2 such as a CRT, a keyboard 3 and a mouse 4 serving as an input device, a digital video deck 5 serving as an information reproducing device for reproducing an information on a video tape 11, an optical disk recording device 6 for recording information in a multimedia optical disk such as a DVD, and an encoder 7. The encoder 7 includes an MPEG2 encoder for encoding video information reproduced by the video deck 5 and AC-3 encoder for encoding audio information also reproduced by the video deck 5. The video deck 5 and the optical disk recording device 6 are connected to the information generating main device 1 through an IEEE1394 interface 8 and a SCSI interface 9, respectively. Incidentally, the above information generating main device 1, display 2, keyboard 3, mouse 4, video deck 5, and optical disk recording device 6 in the video image editing system correspond to an information generating main body, a display, a keyboard, a mouse, a video cassette recorder, and an optical disk recording device, respectively in the invention described in the co-pending U.S. patent application Ser. No. 09/536,690.

Figure 2:
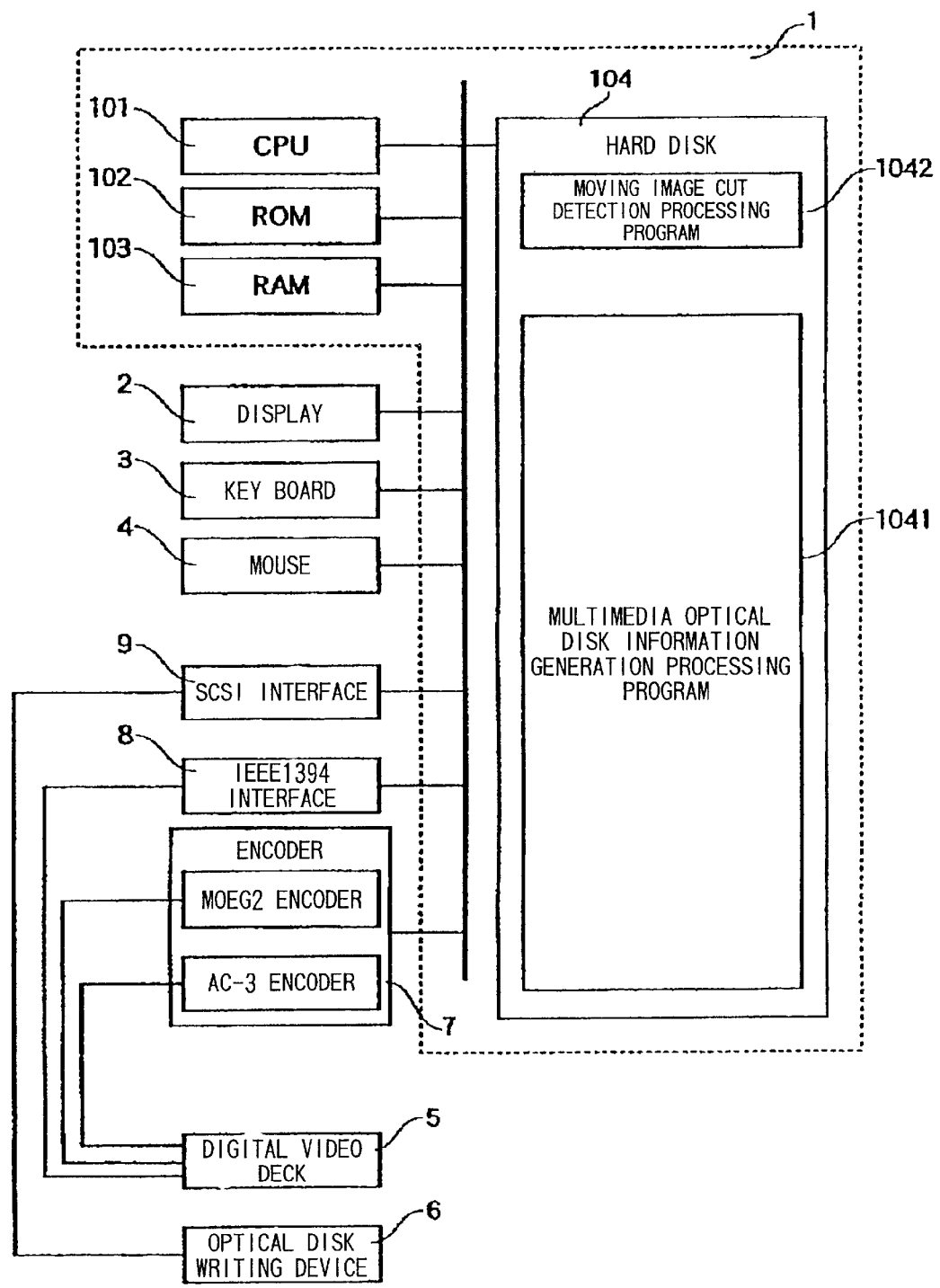
FIG. 2 is a block diagram showing editing system to which the present invention is applied.

FIG. 2 is a block diagram showing the video image editing system to which the present embodiment is applied. The information generating main device 1 includes a CPU 101, a ROM 102 storing therein a BIOS program etc., a RAM 103 for temporarily storing therein data, and a hard disk 104 serving as a storage device for storing various programs for executing each processing routine in the main device 1 and for storing disk image data. These components are connected to the display 2 and he keyboard 3, etc., by a bus line. The information generating main body 1 is provided by an ordinary computer such as a personal computer as described above. The typical programs stored in the hard disk 104 are multimedia optical disk information generation processing program 1941 described in detail in the co-pending U.S. patent application Ser. No. 09/536,690 and moving picture image cut detection processing program 1042 according to the present embodiment. Incidentally, CPU 101, ROM 102, RAM 103, hard disk 104, SCSI interface 9, IEEE1394 interface 8, encoder 7 including MPEG2 encoder and AC-3 encoder in the above described system correspond to CPU, ROM, RAM, hard disk, SCSI interface, serial interface, MPEG2 encoder, AC-3 encoder, respectively those described in the co-pending U.S. patent application Ser. No. 09/536,690.

Figure 10:
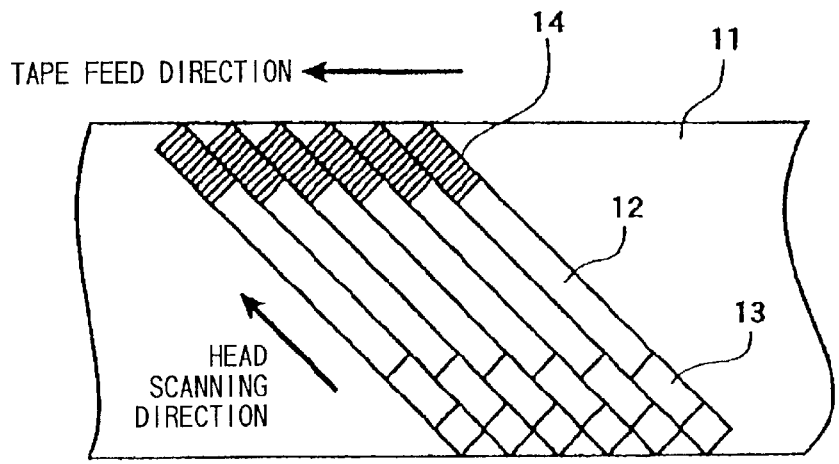
FIG. 10 is a view showing various recording regions in a conventional video tape.
Figure 11:
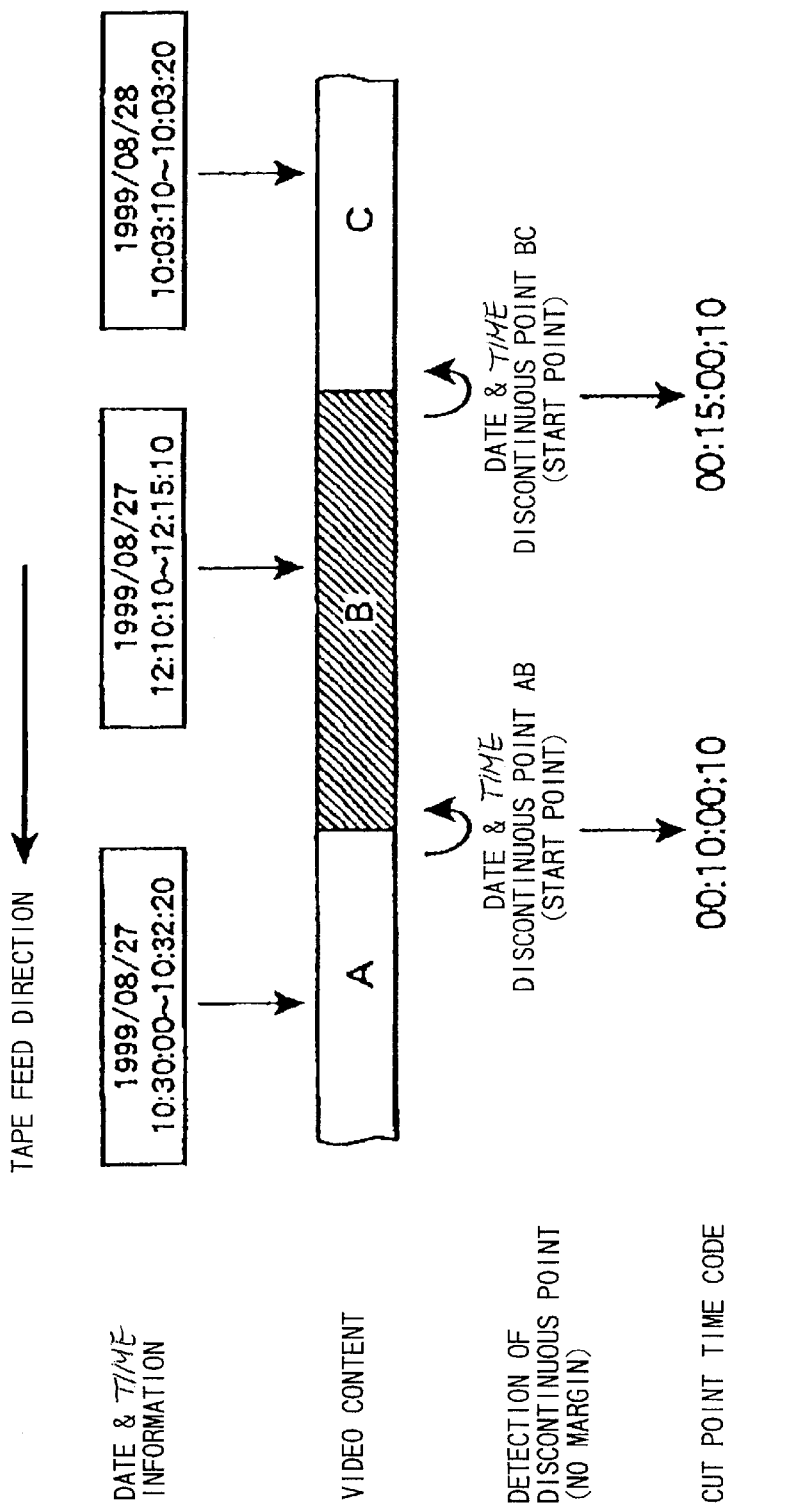
FIG. 11 is a view showing a cut-out of a video image content in a conventional arrangement.

Various control to the video deck 5 such as access to a specific point of a video tape 11, play and stop can be performed with outputting to the video deck 5 control signals through the IEEE1394 interface 8 upon execution of a control program 1041,1042 stored in the hard disk 104. Further, in addition to the video information and the audio information, the video tape 11 records in its subordinate code region 14 (FIG. 10) various information such as image pickup date and time information and time code information indicative of tape position during video playing. A still picture image information, image pickup date and time information, and time code information (tape position information or total playing period information) can be input from the video deck 5 into the information generating main body 1 through the IEEE1394 interface 8. More specifically, the CPU 101 executes the multimedia optical disk information generation processing program 1041 so as to command to the video deck 5 to output various information through the IEEE1394 interface 8 with a protocol meeting with the IEEE1394 standard. Then, the various information are transmitted from the video deck 5 to the computer 1 through the IEEE1494 interface 8 upon completion of preparation of the various information in the video deck 5.

Figure 4:
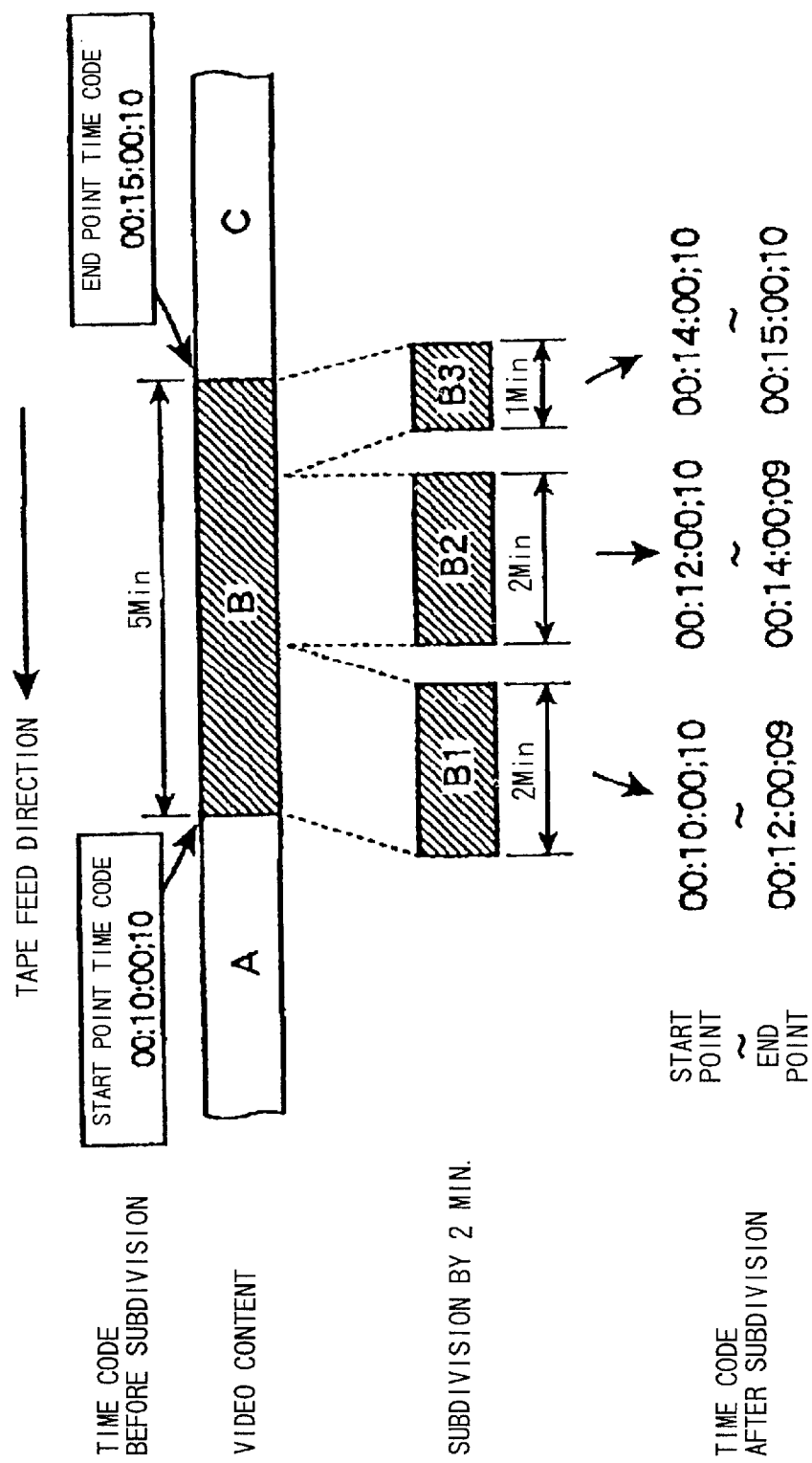
FIG. 4 is a view showing a mode of subdivision of the long period video image content with the time code.

A process for subdividing a long period video image content into a plurality of video image contents according to a first embodiment will be described. In the first embodiment, a video image content is subdivided into a plurality of video image contents having a predetermined time period, if the video image content requires a long period of time. For example, assuming that the video image content B is a five minutes clip in FIG. 4 and the provisionally set maximum playing period of the video image content is 2 minutes, the video image content or clip exceeding 2 minutes is fractionated into a plurality of video image contents each playing period is not more than 2 minutes as shown in FIG. 4.

Figure 3:
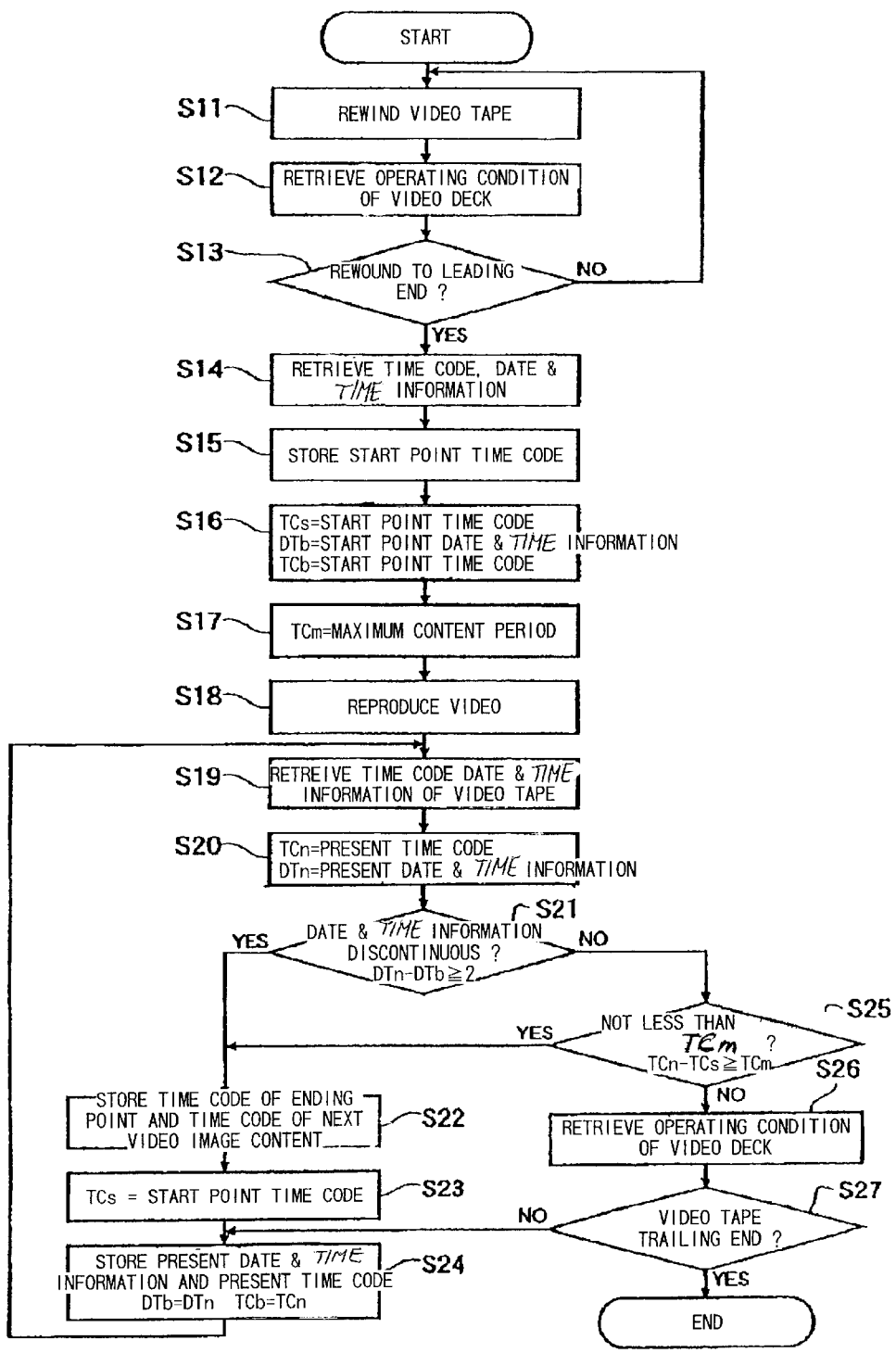
FIG. 3 is a flowchart showing a processing routine for subdividing a long period video image content by a time code according to a first embodiment of the present invention.

FIG. 3 shows a flowchart for a process of subdividing the long period video image into a small period video images. In order to start this process, the video tape 11 must be initially rewound. Therefore, steps S11 through S13 are executed. That is, video tape rewinding for rewinding the video tape to its leading end is started (S11). This is done by transmitting a vide tape rewinding command to the video deck 5 through the IEEE1394 interface 8. In this instance, operating condition of the video deck 5 is retrieved through the IEEE1394 interface (S12), and judgment is made whether or not the operation of the video deck is stopped (S13) to determine that the video tape is rewound to its leading end. If the judgement falls No in S13, the rewinding process S11 through S13 are repeatedly executed. If the video tape is stopped, the judgement falls Yes in S13.

A temporary stopping state is maintained in accordance with an initial time code of the initial video content (generally, 00:00:00;00) at the leading end. The time code at this position (predetermined position) functions as a start point time code of the initial video image content (S14), and this start point time code is stored in the storage device such as the RAM 103 or the hard disk 104 (S15).

Provided that a start point of a first video image content A (FIG. 4) is at the leading end of the video tape. As a result of the tape rewinding to its leading end (S13:Yes), initial values are set in a time code TCs indicative of a start point of the present video image content A (total reproducing time period information at the start point of the video image content), precedent (just before the present) date and time information DTb, and precedent time code TCb (S16). For example, the initial time code TCs is 00:00:00;00. Further, a provisionally set maximum content period TCm of a video image content is retrieved from the hard disk 104 or from the RAM 103 to which data were input by the keyboard 3. This processing is performed while the video deck is temporarily stopped.

Then, reproduction control to the video deck 5 is performed through the IEEE1394 interface 8 (S18) so as to detect the next cut point. Date and time information and time code information in the operating video tape are retrieved through IEEE1394 interface (S19), and the present time code TCn and present date and time information DTn are stored in the storage device such as RAM 103 and the hard disk 104 (S20).

The difference between the present date and time information DTn and the precedent date and time information Dtb is compared with a predetermined time period, for example, 2 seconds (S21). If the difference is smaller than 2 seconds, the determination falls "continuity" (S21:No), and if the difference is not less than 2 seconds, the determination falls "discontinuity" (S21:Yes).

If "discontinuity" is detected (S21:Yes), time code TCb indicative of an ending point of the video image content A (for example 00:10:00;09) and time code TCn indicative of the start point of the next video image content B (for example, 00:10:00;10 in FIG. 4) are stored in the RAM 103 or the hard disk 104 (S22). In S23, the present time code TCn is stored as a time code TCs of a start point which is equivalent to TCs in S16. Further, in S24, the present date and time information DTn is stored as a precedent date and time information DTb which is equivalent to DTb in S16, and the present time code TCn is stored as a precedent time code TCb which is equivalent to TCb in S16. Then the routine goes back to S19 for retrieving again the time code and date and time information.

If discontinuous position cannot be detected (S21:No), judgment is made as to whether or not the difference between the present time code TCn and the start position time code TCs is not less than the maximum video image content period TCm already retrieved in S17 (S25).

If the difference is less than the maximum video image content period TCm (S25:No), operating phase or state of the video deck 5 is checked (S26) to determine whether or not the video tape 11 is fed forward to its trailing end (S27). If the video tape 11 is not fed forward to the trailing end (S27:No), the present date and time information DTn is newly stored as a precedent date and time information DTb, and the time code TCn is newly stored as the precedent time code TCb (S24), and again, the routine goes back to S19 for retrieving the time code and date and time information. On the other hand, if the vide tape 11 is fed to its trailing end, (S27:Yes) the process is ended.

If the detection of the discontinuous position has not been made (S21:No) and if the difference between the present time code TCn and the start point time code TCs is not less than the maximum video image content period TCm of 2 minutes (S25:Yes), the precedently retrieved time code TCb is stored in the RAM 103 or the hard disk 104 as an ending point of the present video image content, and the present time code TCn is stored in the RAM or the hard disk as a start point of a next video image content.

For example, provided that the time code of "00:12:00;10" is presently retrieved in TCn, the computation of TCn−TCs falls 2 minutes, which is judged as being not less than 2 minutes which is the maximum video image content period TCm (S25:Yes). As a result, this point TCn is becoming a subdivision point. Accordingly, "00:12:00;09" stored as TCb as the ending point of the present video image content and "00:12:00;10" stored as TCn as the start point of the next video image content are respectively stored (S22).

FIG. 4 shows the video image contents B1, B2 and B3 each having content period of 2 minutes, 2 minutes and 1 minute, respectively, these being subdivided from the video image content B having content period of 5 minutes. The discontinuous point of the date and time information as a result of Yes in S21 and subdivided points can be used as a cut point of the video image for editing the video image content.

A video image editing processing according to a second embodiment will be described with reference to FIGS. 5 through 7. The second embodiment pertains to a subdivision of the video image content by the constant time period of time code provided that a long period video image content results due to coupling a discontinuous margin period to an actual video image content.

Figure 5:
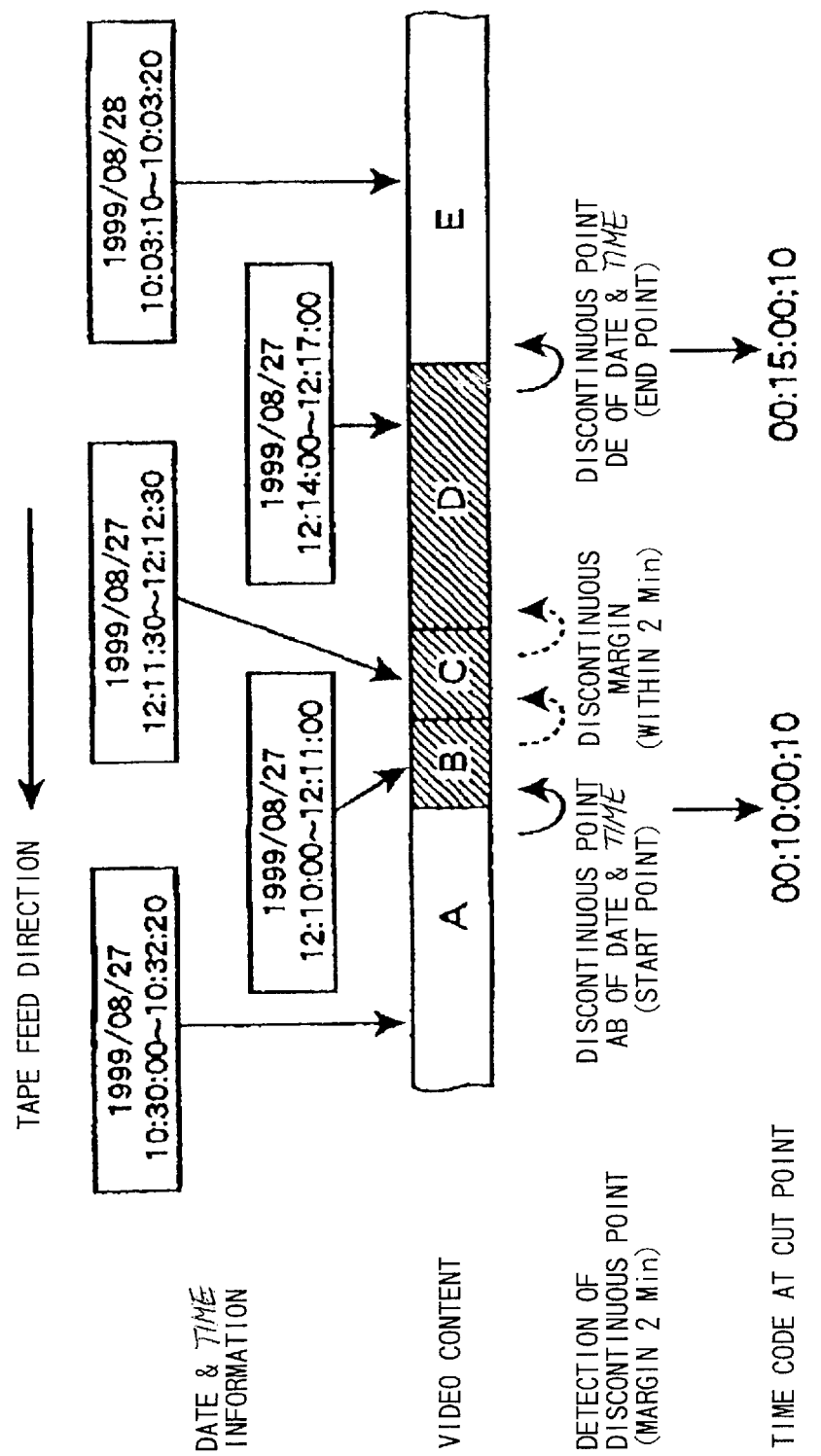
FIG. 5 is a view for description of subdivision of the long period video image content with the time code according to a second embodiment of the present invention.
Figure 6:
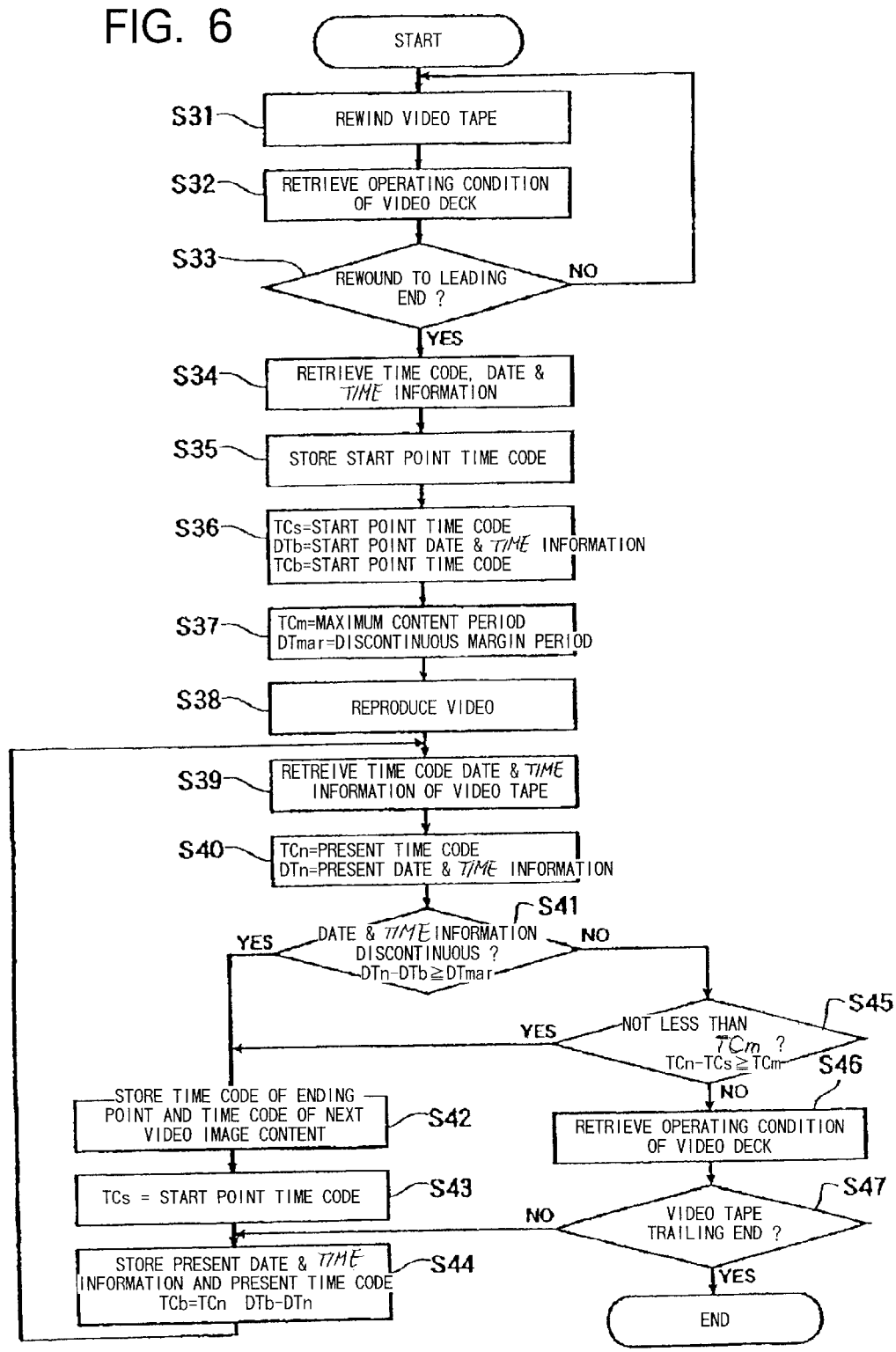
FIG. 6 is a flowchart showing a processing routine for subdividing a long period video image content by the time code according to a second embodiment of the present invention.

In FIG. 5, provided that a discontinuous margin period is determined as 2 minutes. Regarding video image contents B, C and D, a discontinuous period between the contents B and C is 30 seconds, and a discontinuous period between the contents C and D is 1 minutes and 30 seconds. Both discontinuous periods are less than 2 minutes, and are not regarded as discontinuous period. As a result, video image contents B,C and D are coupled together to become a long period video image content having a period of 5 minutes. The second embodiment executes subdivision processing by the constant time period with the time code. The processing routine is shown in the flowchart of FIG. 6.

Fundamental processing is the same as the flow chart shown in FIG. 3 while the discontinuous margin period is set to 2 minutes, and maximum video image content period is set to 2 minutes. Steps S31 to S40 in the flowchart of FIG. 6 are the same as the steps S11 to S20, respectively, in the flowchart of FIG. 3, except that in the step S37 a discontinuous margin period Dtmar already set as well as the maximum vide image content period TCm are retrieved from the RAM 103 or from the hard disk 104.

In S41, the difference between the present date and time information DTn and the precedent date and time information DTb already stored is compared with the discontinuous margin period DTmar (predetermined period). If the difference is not less than the discontinuous margin period Dtmar (S41:Yes), judgment falls discontinuity. If the difference is less than the discontinuous margin period (S41:No), the judgment falls continuity.

If the discontinuous position is detected (S41:Yes), time code TCb indicative of an ending point of the present video image content and time code TCn indicative of the start point of the next video imge content are stored in the RAM 103 or the hard disk 104 (S42).

In S43, the present time code TCn is stored as a time code TCs of a start point which is equivalent to TCs in S36. Further, in S44, the present date and time information DTn is stored as a precedent date and time information which is equivalent to DTn in S36, and the present time code TCn is stored as a precedent time code TCb which is equivalent to TCb in S36. Then the routine goes back to S39 for monitoring the discontinuous position of the date and time information.

If discontinuous position cannot be detected (S41:No), judgment is made as to whether or not the difference between the present time code TCn and the start position time code TCs is not less than the maximum video image content period TCm already retrieved in S37 (S45).

If the difference is less than the maximum video image content period TCm (S45:No), operating phase or state of the video deck 5 is checked (S46) to determine whether or not the video tape 11 is fed forward to its trailing end (S47). If the video tape 11 is not fed forward to the trailing end (S47:No), the present date and time information DTn is newly stored as a precedent date and time information DTb, and the time code TCn is newly stored as the precedent time code TCb (S44), and again, the routine goes back to S39 for again monitoring the discontinuous position of the date and time information. On the other hand, if the vide tape 11 is fed to its trailing end, (S47:Yes) the process is ended.

If the detection of the discontinuous position has not been made (S41:No) and if the difference between the present time code TCn and the start point time code TCs is not less than the maximum video image content period TCm of 2 minutes (S45:Yes), the time code TCb is stored in the RAM 103 or the hard disk 104 as an ending point of the present video image content, and the time code TCn is stored in the RAM or the hard disk as a start point of a next video image content (S42). In S43, the time code TCn is stored as a time code TCs of a start point which is equivalent to TCs in S36. Further, in S44, the date and time information DTn is stored as a precedent date and time information DTb which is equivalent to DTb in S36, and the time code TCn is stored as a precedent time code TCb which is equivalent to TCb in S36. Then the routine goes back to S39 for again monitoring the discontinuous position of the date and time information. The position where the difference between TCn and TCs is not less than TCm (S45:Yes) serves as a cut point of the video image, and the cut point is utilized for video editing.

Figure 7:
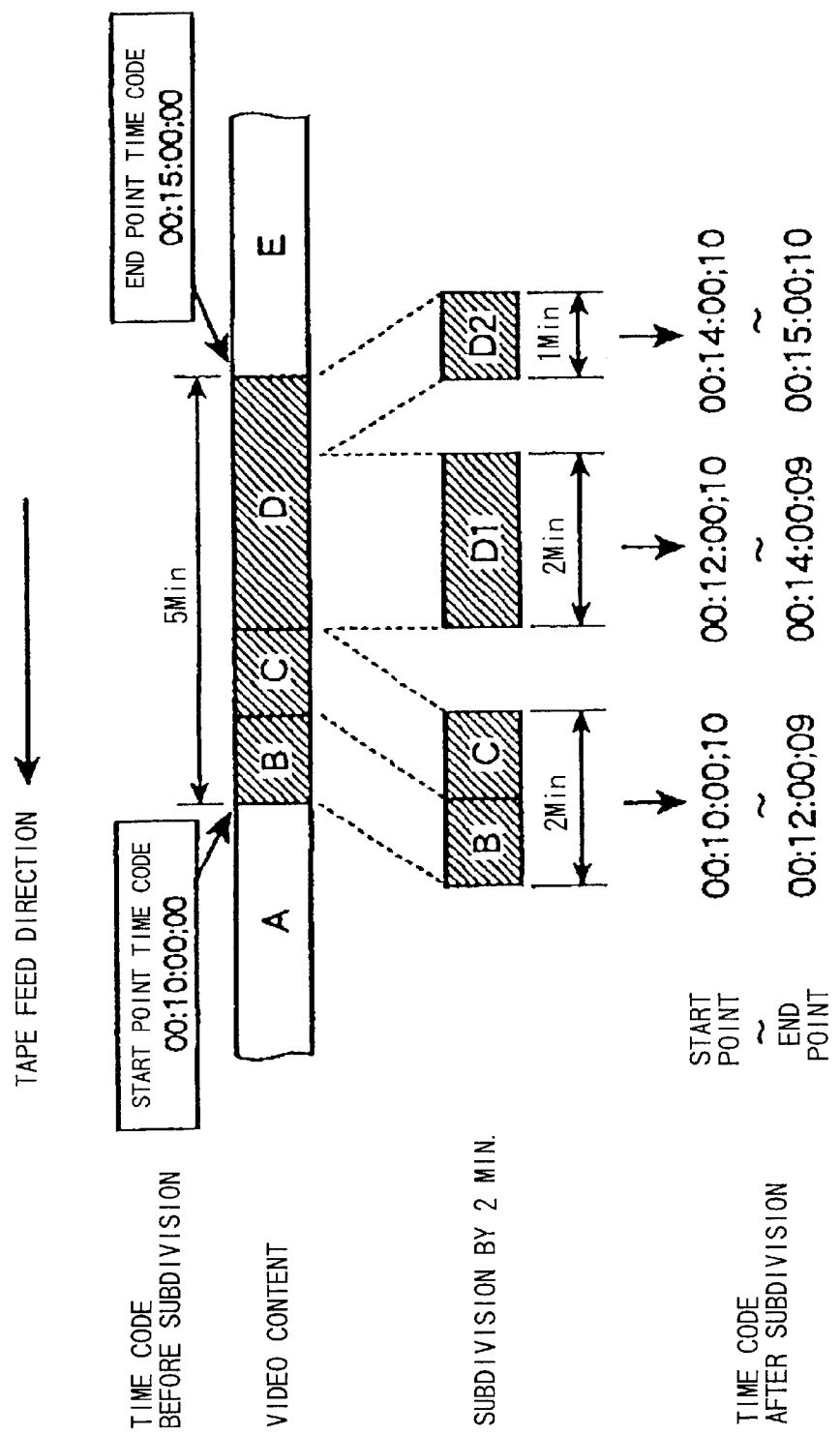
FIG. 7 is a view showing a mode of subdivision of the long period video image content with the time code according to the second embodiment of the present invention.

FIG. 7 shows a manner in which the video image contents B, C and D are subdivided by every 2 minutes time code which is the discontinuous margin period. Provided that each of the video image contents B and C has 1 minute length, and video image content D has 3 minutes length which is greater than the maximum video image content period TCm of 2 minutes. As a result of subdivision, a first cut-out video image content BC is a combination of B and C, a second cut-out video image content D1 is a part of the content D having 2 minutes length, and a third cut-out video image content D2 is a remaining part of the content D having 1 minute length.

In this way, through detection of the discontinuous position of the date and time information of the video image contents and through monitoring whether or not the time period from the start point time code to the present time code is not less than the maximum vide image content period already set, a totally 5 minutes video image content consisting of the content B, C and D is subdivided by 2 minutes into two pieces of 2 minutes length, and 1 piece of 1 minute length, i.e., BC, D1 and D2.

A video image editing processing according to a third embodiment will be described with reference to FIGS. 8 and 9. The third embodiment pertains to a subdivision of the video image content by a constant time period of date and time information provided that a long period video image content results due to coupling of a plurality of video image contents with the discontinuous margin period.

Figure 8:
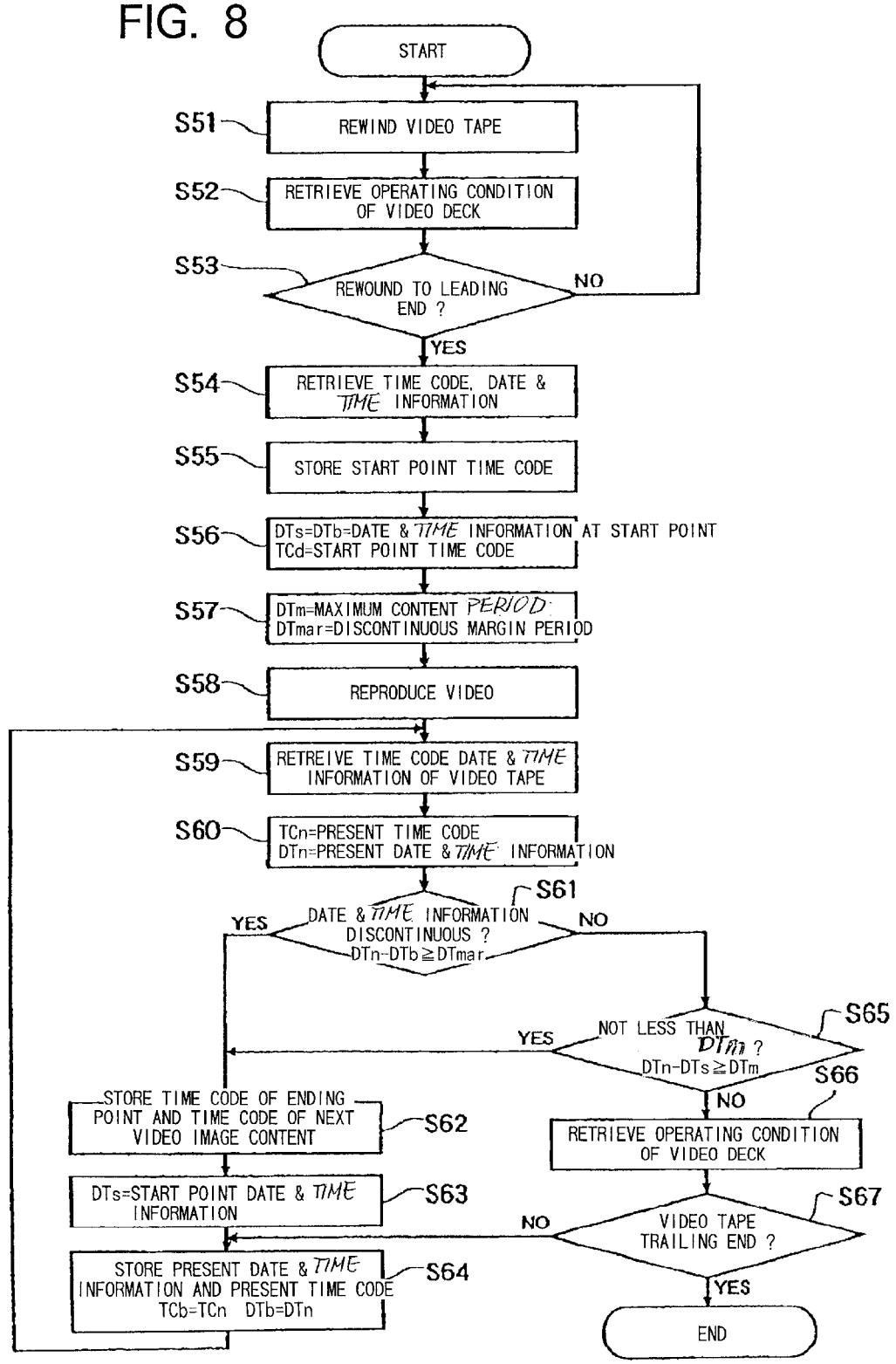
FIG. 8 is a flowchart showing a processing routine for subdividing a long period video image content by date and time information according to a third embodiment of the present invention.

Steps S51 through S55 in the flowchart of FIG. 8 are the same as the steps S11 through S15, respectively in the flowchart of FIG. 3.

Next, initial values are set in a date and time information DTs indicative of a start point of the present video image content, precedent date and time information DTb, and precedent time code TCb (S56). Incidentally, the date and time information DTs and DTb are initiallized with the same value. Further, a previously set maximum content period DTm of a video image content and a discontinuous margin time period Dtmar are retrieved from the hard disk 104 or from the RAM 103 to which data were input by the keyboard 3 (S57).

Then, reproduction control to the video deck 5 is performed through the IEEE1394 interface 8 (S58). Date and time information and time code information in the operating video tape are retrieved through IEEE1394 interface (S59), and the present time code TCn and present date and time information DTn are stored in the storage device such as RAM 103 and the hard disk 104 (S60).

In S61, the difference between the present date and time information DTn and the precedent date and time information DTb already stored is compared with the discontinuous margin period DTmar. If the difference is not less than the discontinuous margin period Dtmar (S61:Yes), judgment falls discontinuity. If the difference is less than the discontinuous margin period (S61:No), the judgment falls continuity.

If the discontinuous position is detected (S61:Yes), time code TCb indicative of an ending point of the present video image content, and time code TCn indicative of the start point of the next video image content are stored in the RAM 103 or the hard disk 104 (S62).

In S63, the present date and time information DTs is stored as a new date and time information DTs of a start point. Further, in S64, the present date and time information DTn is stored as a precedent date and time information DTb, and the present time code TCn is stored as a precedent time code TCb. Then the routine goes back to S59 for monitoring the discontinuous position of the date and time information.

If discontinuous position cannot be detected (S61:No), judgment is made as to whether or not the difference between the present date and time information DTn and the start position date and time information DTs is not less than the maximum video image content period DTm already retrieved in S37 (S65). If the difference is less than the maximum video image content date and time (S65:No), operating phase or state of the video deck 5 is checked (S66) to determine whether or not the video tape 11 is fed forward to its trailing end (S67). If the video tape 11 is not fed forward to the trailing end (S67:No), the present date and time information DTn is newly stored as a precedent date and time information DTb, and the present time code TCn is newly stored as the precedent time code TCb (S64), and again, the routine goes back to S69 for again monitoring the discontinuous position of the date and time information. On the other hand, if the vide tape 11 is fed to its trailing end, (S67:Yes) the process is ended.

If the detection of the discontinuous position has not been made (S61:No), and if the difference between the present date and time information DTn (for example "Aug. 27, 1999, 12:12:30" at the video image content C in FIG. 9(*a*)) and the start point date and time information DTs (for example, "Aug. 27, 1999, 12:10:00" of the video image content B) is not less than the maximum video image content period DTm (for example, 2 minutes) (S65:Yes), the time code TCb (for example, end point time code "00:11:00;09" of the video image content B in FIG. 9(*a*)) is stored in the RAM 103 or the hard disk 104 as an ending point time code of the present video image content, and the time code TCn (for example, start point time code "00:11:00;10" of the video image content C in FIG. 9(*a*)) is stored in the RAM or the hard disk as a start point time code of a next video image content (S62). The position where the difference between DTn and DTs is not less than DTm (S65:Yes) serves as a cut point of the video image, the cut point being utilized for video editing.

Regarding a video image content D where continuous image pick up was performed for more than 2 minutes, the video image content D is divided into D1 and D2 at a point where the difference between the present date and time information DTn and the start point date and time information DTs exceeds 2 minutes.

In this way, through detection of the discontinuous position of the date and time information of the video image contents and through monitoring whether or not the time period from the start point date and time information DTs to the present date and time information DTn is not less than the maximum vide image content period DTm already set, a totally 5 minutes video image content consisting of the content B, C and D is subdivided by maximum 2 minutes into three pieces of 1 minutes length (B, C, D2), and 1 piece of 2 minutes length (D1). i.e., into B, C, D1 and D2.

Figure 9B:
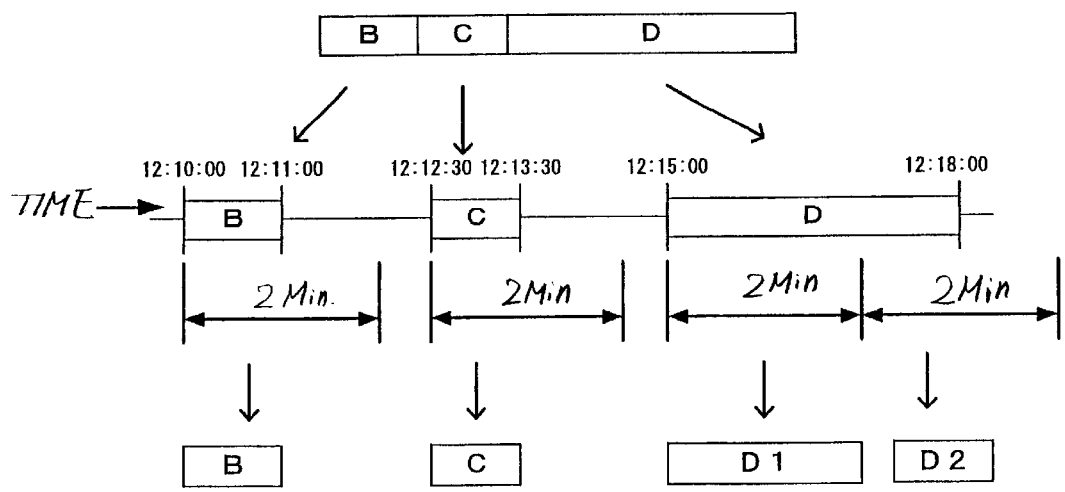
FIG. 9(b) is a view showing a mode of subdivision of video image contents B, C and D of FIG. 9(a) for particularly describing subdivision by 2 minutes.

More specifically, the video image contents B,C and D of FIG. 9(a) are shown in FIG. 9(b) in a time axis basis. It should be noted that since the time difference between the end point of B "12:11:00" and start point of C "12:12:30" is 1 minute thirty second, the maximum 2 minutes is at a point between the end point of B and the start point of C. In such a case, 1 minute length of B is provided as a result of subdivision. The same is true with respect to the video image content C. The maximum 2 minutes is at a point between the end point of C and the start point of D, so that 1 minute length of C is provided as a result of subdivision.

While the invention has been described in detail and with reference to the specific embodiments thereof, it would be apparent to those skilled in the art that various changes and modifications may be made therein without departing from the spirit and scope of the invention.

For example, in the above described embodiments, the time code is used for representing the tape position information and total reproducing period information. However, in case of the video deck which does not output the time code, the tape position information can be defined by various ways, for example by either one of date and time information, total counter information, information of characteristic of video and audio information, information of rewinding period and reproducing period, and tape length information. Further, total reproducing period information can be defined by various ways, for example by either one of total counter information, information of rewinding period and reproducing period, and tape length information. Incidentally, those skilled in the art can easily modify the processing routine so as to cope with the information other than the time code.

Further, in the depicted embodiment, video image editing process is performed in the information generating device 1 such as a computer. However, the present invention is not limited to this fashion. For example, the personal computer 1, the optical disk writing device 6, the encoder 7, and the IEEE1394 interface 8 can be combined together. To this effect, an optical disk writing device can be provided with processing function equivalent to IEEE1394 interface 8 and encoder 7 those shown in FIG. 1, and a CRT display can be connected to the optical disk writing device through a monitor interface. Also, instead of the input device such as the keyboard 3 and the mouse 4, a front panel button such as a recording button, a play button and a stop button of the video deck 5, and a remote control button of the video deck 5 can be used as an input device. Also the optical disk writing device can be provided with a CPU, a RAM and a ROM storing therein the program identical with the program stored in the hard disk 104. With this arrangement, the optical disk writing device can serve as a main device provided with a video image editing function. Such a optical disk writing device can then be connected to the video deck 5, and as a result, a video image editing system can be provided.

What is claimed is:

1. A video image edit device for editing at least one video image content among a plurality of video image contents those recorded on a recording medium, the recording medium also recording thereon time information indicative of data of time at which image pick up operation is performed for recording the video image content into the recording medium, and data of total reproducing period indicative of a recording position of the recording medium, the device comprising:

a storage device that stores data of present total reproducing period and data of present time information with respect to the present video image content, data of precedent time information, data of total reproducing period information with respect to a start point of a video image content to be edited, and a maximum video image content period;

a judging device that judges a discontinuity when a difference between the present time and the precedent time exceeds a predetermined level;

a subdivision determination device that determines a necessity of subdivision if the judging device judges a continuity and if a difference between a present total reproducing period and a total reproducing period at the start point exceeds the maximum video image content period; and a subdivision device that subdivides the video image content to be edited if the subdivision judgment device judges the necessity.

2. The video image edit device as claimed in claim 1, further comprising a recording medium rewinding and feeding unit for rewinding and feeding the recording medium.

3. The video image edit device as claimed in claim 2, wherein a video image content is constituted by a plurality of frames, and the total reproducing period is represented by a time code for each frame and further comprising:

a stop device that stops rewinding operation of the recording medium rewinding and feeding unit when the recording medium is rewound to a predetermined position of the recording medium;

a first retrieving device that retrieves a time code at the predetermined position of the recording medium;

a setting device that sets initial values with respect to a start point time code of a video image content at the predetermined position of the recording medium, a precedent time information, and precedent time code;

a start device that starts feeding operation by the recording medium rewinding and feeding unit after the setting device sets the initial values; and, a second retrieving device that retrieves the time information and time code with respect to the fed recording medium for every the frame basis.

4. The video image edit device as claimed in claim 3, wherein the subdivision device comprises:

a first setting device that sets a time code at an end point of the subdivided video image content as a result of the subdivision;

a second setting device that sets a time code at a start point next to the subdivided video image content;

a third setting device that sets a present time code as a start point time code for the next video image content; and a fourth setting device that sets a present time information as a precedent time information; and a fifth setting device that sets a present time code as a precedent time code.

5. The video image edit device as claimed in claim 1, wherein the subdivision device also subdivides the video image content to be edited if the judging device judges the discontinuity.

6. The video image edit device as claimed in claim 5, further comprising a recording medium rewinding and feeding unit for rewinding and feeding the recording medium.

7. The video image edit device as claimed in claim 6, wherein a video image content is constituted by a plurality of frames, and the total reproducing period is represented by a time code for each frame and further comprising:

a stop device that stops rewinding operation of the recording medium rewinding and feeding unit when the recording medium is rewound to a predetermined position of the recording medium;

a first retrieving device that retrieves a time code at the predetermined position of the recording medium;

a setting device that sets initial values with respect to a start point time code of a video image content at the predetermined position of the recording medium, a precedent time information, and precedent time code;

a start device that starts feeding operation by the recording medium rewinding and feeding unit after the setting device sets the initial values; and, a second retrieving device that retrieves the time information and time code with respect to the fed recording medium for every the frame basis.

8. The video image edit device as claimed in claim 7, wherein the subdivision device comprises:

a first setting device that sets a time code at an end point of the subdivided video image content as a result of the subdivision;

a second setting device that sets a time code at a start point next to the subdivided video image content;

a third setting device that sets a present time code as a start point time code for the next video image content; and a fourth setting device that sets a present time information as a precedent time information; and a fifth setting device that sets a present time code as a precedent time code.

9. The video image edit device as claimed in claim 1, wherein the storage device further stores a discontinuous margin period indicative of a maximum period of non-video image area between neighboring video image contents, the discontinuous margin period serving as the predetermined level in the judging device.

10. The video image edit device as claimed in claim 9, further comprising a recording medium rewinding and feeding unit for rewinding and feeding the recording medium.

11. The video image edit device as claimed in claim 10, wherein a video image content is constituted by a plurality of frames, and the total reproducing period is represented by a time code for each frame and further comprising:

a stop device that stops rewinding operation of the recording medium rewinding and feeding unit when the recording medium is rewound to a predetermined position of the recording medium;

a first retrieving device that retrieves a time code at the predetermined position of the recording medium;

a setting device that sets initial values with respect to a start point time code of a video image content at the predetermined position of the recording medium, a precedent time information, and precedent time code;

a start device that starts feeding operation by the recording medium rewinding and feeding unit after the setting device sets the initial values; and, a second retrieving device that retrieves the time information and time code with respect to the fed recording medium for every the frame basis.

12. The video image edit device as claimed in claim 11, wherein the subdivision device comprises:

a first setting device that sets a time code at an end point of the subdivided video image content as a result of the subdivision;

a second setting device that sets a time code at a start point next to the subdivided video image content;

a third setting device that sets a present time code as a start point time code for the next video image content;

a fourth setting device that sets a present time information as a precedent time information; and a fifth setting device that sets a present time code as a precedent time code.

13. The video image edit device as claimed in claim 9, wherein the subdivision device also subdivides the video image content to be edited if the judging device judges the discontinuity.

14. The video image edit device as claimed in claim 13, further comprising a recording medium rewinding and feeding unit for rewinding and feeding the recording medium.

15. The video image edit device as claimed in claim 14, wherein a video image content is constituted by a plurality of frames, and the total reproducing period is represented by a time code for each frame and further comprising:

a stop device that stops rewinding operation of the recording medium rewinding and feeding unit when the recording medium is rewound to a predetermined position of the recording medium;

a first retrieving device that retrieves a time code at the predetermined position of the recording medium;

a setting device that sets initial values with respect to a start point time code of a video image content at the predetermined position of the recording medium, a precedent time information, and precedent time code;

a start device that starts feeding operation by the recording medium rewinding and feeding unit after the setting device sets the initial values; and, a second retrieving device that retrieves the time information and time code with respect to the fed recording medium for every the frame basis.

16. The video image edit device as claimed in claim 15, wherein the subdivision device comprises:

a first setting device that sets a time code at an end point of the subdivided video image content as a result of the subdivision;

a second setting device that sets a time code at a start point next to the subdivided video image content;

a third setting device that sets a present time code as a start point time code for the next video image content;

a fourth setting device that sets a present time information as a precedent time information; and a fifth setting device that sets a present time code as a precedent time code.

17. The video image edit device as claimed in claim 16, wherein the time information includes date information.

18. A video image edit device for editing at least one video image content among a plurality of video image contents those recorded on a recording medium, the recording medium also recording thereon time information indicative of data of time at which image pick up operation is performed for recording the video image content into the recording medium, and data of total reproducing period indicative of a position of the recording medium, the device comprising:

a storage device that stores data of present time information with respect to a present video image content, data of precedent time information, data of time information with respect to a start point of a video image content to be edited, and a maximum content period;

a judging device that judges a discontinuity when a difference between the present time and the precedent time exceeds a predetermined level;

a subdivision determination device that determines a necessity of subdivision if the judging device judges a continuity and if a difference between a present time and a time at the start point exceeds the maximum content period; and a subdivision device that subdivides the video image content to be edited if the subdivision judgment device judges the necessity.

19. The video image edit device as claimed in claim 18, wherein the storage device further stores a discontinuous margin period indicative of a maximum period of non-video image area between neighboring video image contents, the discontinuous margin period serving as the predetermined level in the judging device.

20. The video image edit device as claimed in claim 19, wherein the subdivision device also subdivides the video image content to be edited if the judging device judges the discontinuity.

21. The video image edit device as claimed in claim 20, further comprising a recording medium rewinding and feeding unit for rewinding and feeding the recording medium.

22. The video image edit device as claimed in claim 21, wherein a video image content is constituted by a plurality of frames, and the total reproducing period is represented by a time code for each frame and further comprising:

a stop device that stops rewinding operation of the recording medium rewinding and feeding unit when the recording medium is rewound to a predetermined position of the recording medium;

a first retrieving device that retrieves a time code at the predetermined position of the recording medium;

a setting device that sets initial values with respect to a start point time information of a video image content at the predetermined position of the recording medium, a precedent time information, and precedent time code;

a start device that starts feeding operation by the recording medium rewinding and feeding unit after the setting device sets the initial values; and, a second retrieving device that retrieves the time information and time code with respect to the fed recording medium for every the frame basis.

23. The video image edit device as claimed in claim 22, wherein the subdivision device comprises:

a first setting device that sets a time code at an end point of the subdivided video image content as a result of the subdivision;

a second setting device that sets a time code at a start point next to the subdivided video image content;

a third setting device that sets a present time information as a start point time information for the next video image content;

a fourth setting device that sets a present time information as a precedent time information; and a fifth setting device that sets a present time code as a precedent time code.

24. The video image edit device as claimed in claim 23, wherein the time information includes date information.

25. A video image edit program storage medium for editing at least one video image content among a plurality of video image contents those recorded on a recording medium, the recording medium also recording thereon time information indicative of data of time at which image pick up operation is performed for recording the video image content into the recording medium, and data of total reproducing period indicative of a recording position of the recording medium, the storage medium containing:

a program of storing data of present total reproducing period and data of present time information with respect to the present video image content, data of precedent time information, data of total reproducing period information with respect to a start point of a video image content to be edited, and a maximum video image content period;

a program of judging a discontinuity when a difference between the present time and the precedent time exceeds a predetermined level;

a program of determining a necessity of subdivision if the judging program judges a continuity and if a difference between a present total reproducing period and a total reproducing period at the start point exceeds the maximum video image content period; and a program of subdividing the video image content to be edited if the judging program judges the necessity.

26. A video image edit program storage medium for editing at least one video image content among a plurality of video image contents those recorded on a recording medium, the recording medium also recording thereon time information indicative of data of time at which image pick up operation is performed for recording the video image content into the recording medium, and data of total reproducing period indicative of a position of the recording medium, the storage medium containing:

a program of storing data of present time information with respect to a present video image content, data of precedent time information, data of time information with respect to a start point of a video image content to be edited, and a maximum content period;

a program of judging a discontinuity when a difference between the present time and the precedent time exceeds a predetermined level;

a program of determining a necessity of subdivision if the judging program judges a continuity and if a difference between a present time and a time at the start point exceeds the maximum content period; and a program of subdividing the video image content to be edited if the subdivision judgment program judges the necessity.

* * * * *